United States Patent [19]

Giles

[11] 4,139,354
[45] Feb. 13, 1979

[54] FILTER FOR THE REMOVAL OF PARTICULATE AND VAPOROUS MERCURY

[75] Inventor: Dean G. Giles, Valinda, Calif.

[73] Assignee: Futurecraft Corporation, City of Industry, Calif.

[21] Appl. No.: 817,670

[22] Filed: Jul. 21, 1977

[51] Int. Cl.² .............................................. B01D 53/04
[52] U.S. Cl. ........................................... 55/387; 55/72; 55/510
[58] Field of Search ....................... 55/72, 74, 387, 510

[56] References Cited

U.S. PATENT DOCUMENTS

| | | | |
|---|---|---|---|
| 3,047,370 | 7/1962 | Avtges et al. | 55/387 X |
| 3,477,210 | 11/1969 | Hervert | 55/387 |
| 3,541,765 | 11/1970 | Adler et al. | 55/510 X |
| 3,555,787 | 1/1971 | Lustig | 55/387 X |
| 3,572,013 | 3/1971 | Hansen | 55/510 X |
| 3,662,523 | 5/1972 | Revoir et al. | 55/387 |
| 3,727,597 | 4/1973 | Hensler | 55/387 X |
| 3,747,303 | 7/1973 | Jordan | 55/387 X |

Primary Examiner—Robert H. Spitzer
Attorney, Agent, or Firm—James E. Brunton

[57] ABSTRACT

A small annular-shaped filter specially designed for use in controlled atmosphere work enclosures of the type used in dental operatories and the like for performing mercury handling operations. The filter can be conveniently removably mounted within the air outlet parts of the work enclosures and contains a filtering material specially developed for efficient removal of mercury vapor from the air passing through the filter.

6 Claims, 4 Drawing Figures

FILTER FOR THE REMOVAL OF PARTICULATE AND VAPOROUS MERCURY

BACKGROUND OF THE INVENTION

1. Field of the Invention

The present invention relates generally to filters for removing mercury vapor from the air and to the method of making same. More particularly, the invention relates to small annular-shaped filters for use in controlled atmosphere work enclosures of the type adapted to be used in dental operatories for mixing, mulling, cutting, and storing amalgam.

2. Discussion of the Prior Art

Mercury is used for a wide variety of industrial, chemical, medical, and dental purposes. Only recently, however, has the extreme danger of environmental contamination with mercury been realized. Mercury is a highly migratory, virulent poison that is readily absorbed by humans through the respiratory system, the gastrointestinal system and through unbroken skin. The maximum allowable concentration of mercury vapor in the air has been set at 50 micrograms per cubic meter. Since air saturated with mercury vapor at 20° C contains a mercury concentration which exceeds the toxic limit by over 100 times, the critical hazards presented by mercury handling are at once apparent. Compounding the problem is the fact that in the human being mercury acts as a cumulative poison since only small amounts can be eliminated at a time by the human body.

Of particular concern are the hazards presented through careless handling of mercury in the dental office and dental operatory. In fact, the abnormally high rate of suicide among dentists is believed by many experts to be directly linked to mercury poisoning. Since the dental profession in the United States uses in excess of 200,000 pounds of mercury per year, or about four percent of the total amount used in the United States, a significant threat is presented, not only to the health of the dentist, but to his auxiliary personnel as well.

Environmental contamination through the use of mercury in dental operatories originates primarily from mercury spills and leakage or failure of mercury-containing capsules used in the trituration process. Additionally, mere excitation of any mercury contamination which may reside on the surfaces of the capsules or upon tools and equipment used in the operatory causes the mercury to vaporize and immediately spread throughout the adjacent areas. Also, contributing to the inordinately high level of mercury contamination found in dental offices and operatories is simple carelessness by the dentist and his assistants in the open air mulling, amalgam cutting, and mercury storage.

One of the most successful systems developed for use in handling mercury in dental and industrial operations is disclosed in pending application Ser. No. 779,013. The apparatus of this invention comprises a work station having a totally enclosed, controlled environment workspace wherein various mercury handling operations such as mixing, mulling, and amalgam cutting can be accomplished in absolute safety with no fear of personnel or atmospheric contamination. Mercury spills are completely contained within the unit and due to the novel design of the air-circulating system of the unit, a unique air flow pattern is continuously maintained within the enclosure to enable highly effective control of both vaporous and particulate mercury within the system. Although the filter of the present invention may be used in a wide variety of applications, it is ideally suited for use in work stations of the type described in Ser. No. 779,013. By placing the filter in the air outlet port of the unit, within the path of the air stream, all mercury contamination may be removed from the air prior to its emission into the atmosphere.

It is known in the art that iodized charcoals or charcoals prepared from coconut shells are capable of absorbing mercury vapor. In the past, therefore, various types of filters using such materials have been suggested. Typically, however, these filters have been designed for large scale industrial operations. The filters themselves, therefore, are generally quite large and bulky, often weighing several hundred pounds. With these filters, which are generally provided in the form of long tubular members filled with the charcoal, the air exhausted from the mercury handling area is passed through the length of the filter at very low velocity. Little, if any, work has been done in the past toward the development of a small, highly efficient filter such as that herein described for use with small mercury handling work enclosures. As will be appreciated from the description which follows, the filter of the present invention can be conveniently, replaceably mounted within the outlet port of a laboratory-type work enclosure. Due to its unique design, the filter can function in a highly efficient manner to remove mercury contaminants even from a relatively high velocity stream of air being emitted from the work enclosure. To applicant's knowledge, such a filter has not previously been developed.

SUMMARY OF THE INVENTION

It is an object of the present invention to provide a small, highly efficient filter for use in connection with laboratory-type work enclosures for filtering mercury contaminants from the air emitted from the enclosures.

It is another object of the invention to provide a filter of the aforementioned character which is self-contained and may be readily mounted within and removed from the air outlet ports of the work enclosure.

It is another object of the invention to provide a filter as described which provides controlled impedance to the flow of air therethrough.

It is still another object of the invention to provide a filter as described in the preceeding paragraphs which is of rugged construction, virtually impervious to damage during normal handling.

It is another object of the invention to provide a method of making a filter of the character described which can be performed expeditiously using standard molding techniques and readily available materials and equipment.

It is yet another object of the invention to provide a filter and a method of making same of the character described which is inexpensive so that its contents can be destroyed after the mercury has been reclaimed from the saturated filter.

DESCRIPTION OF THE INVENTION

Figures 1, 2:
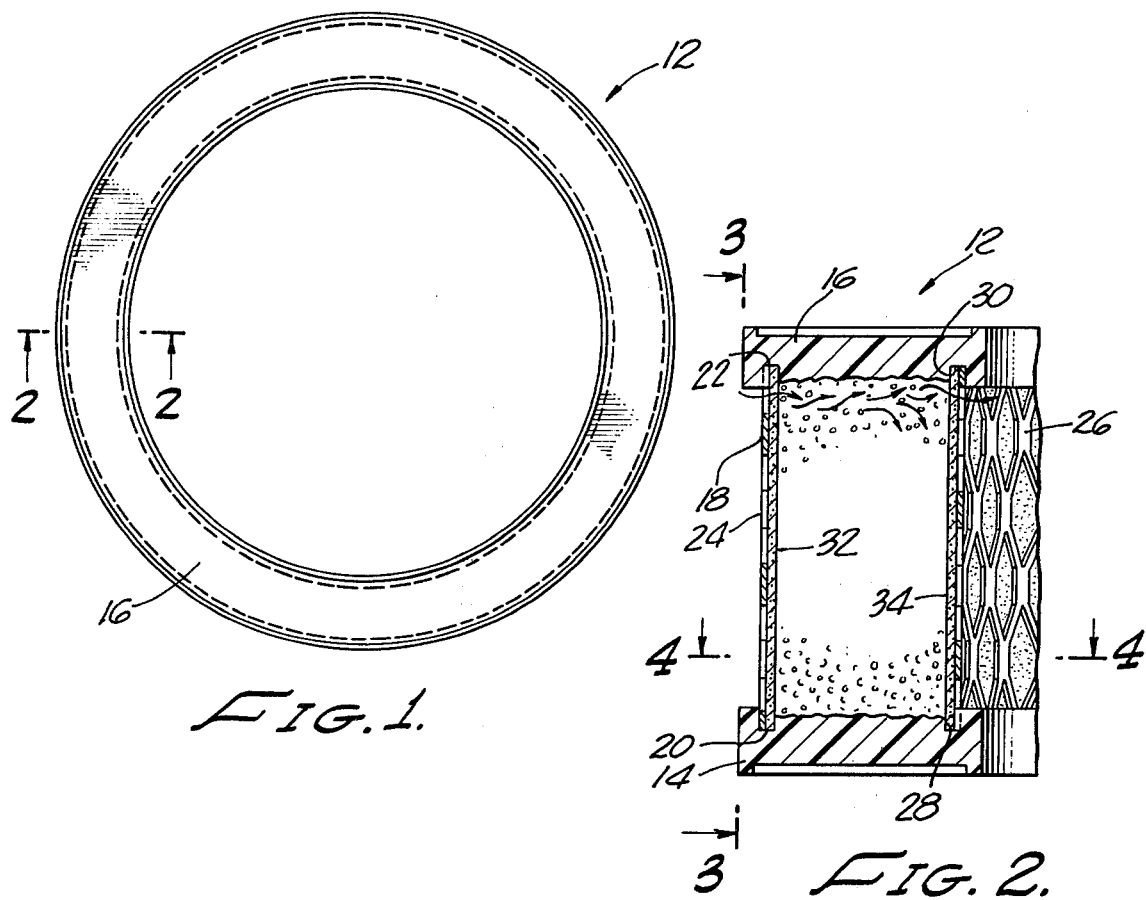
FIG. 1 is a plan view of the filter of the invention.
FIG. 2 is an enlarged fragmentary cross-sectional view taken along lines 2—2 of FIG. 1.

Referring to the drawings and particularly to FIGS. 1 and 2, the filter of the present invention is generally designated by the numeral 12. Although the filter of the invention may be used for removing various types of vapor and particulate contaminates, it is designed particularly for the removal of mercury vapor by a stream of air passing through the walls of the filter. More particularly, the embodiment of the invention illustrated in the drawings is adapted to be removably mounted within a circular-shaped outlet port of a controlled environment work enclosure of the type illustrated and described in Application Ser. No. 779,013.

In the embodiment of the invention illustrated in the drawings, the filter comprises an annular disc-shaped base member 14 and a vertically spaced apart annular-shaped disc top member 16. Referring to FIG. 2, it can be seen that the opposing surfaces of members 14 and 16 are irregular. The configuration of members 14 and 16, as shown in FIG. 2, causes air to flow through the filter in the manner shown by the arrows of FIG. 2 and prevents a "channeling" effect. Extending between members 14 and 16 is a substantially cylindrically shaped first outer wall 18. The upper and lower marginal edges of wall 18 extend into circular grooves 20 and 22 formed proximate the outer periphery of members 14 and 16 respectively. As best seen by referring to FIG. 3, wall 18 is preferably constructed from an open weave wire mesh having a plurality of openings 24 therethrough. Transversely spaced from wall 18 is a first substantially cylindrically shaped inner wall 26. The upper and lower marginal edges of wall 26 are received within grooves 28 and 30 formed in members 14 and 16 respectively, proximate the inner periphery of said members.

Figures 3, 4:
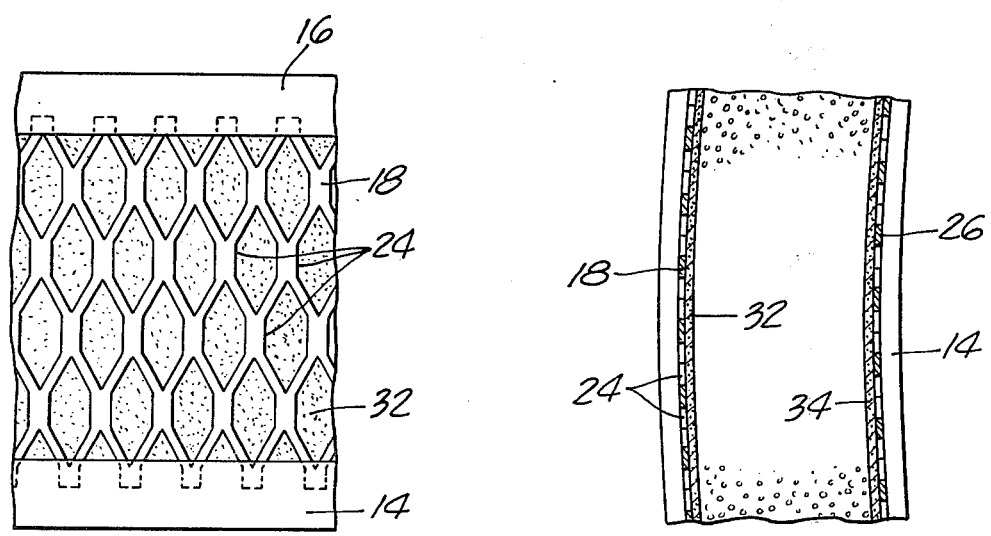
FIG. 3 is a side elevational view taken along lines 3—3 of FIG. 2.
FIG. 4 is a cross-sectional view taken along lines 4—4 of FIG. 2.

Referring to FIGS. 2 and 4 extending between members 14 and 16, is a second outer wall 32. Wall 32 is generally cylindrically shaped, is substantially coextensive in height with first outer wall 18, and is constructed of a porous membrane material such as filter paper or the like. As shown in the drawings, wall 32 is closely telescopically received within wall 18 and has its upper and lower margins received within grooves 20 and 22. Also extending between members 14 and 16 is a second inner wall 34 located intermediate second outer wall 32 and first inner wall 26. Wall 34 is substantially cylindrically shaped and is closely received over wall 26. This wall, like wall 32, is preferably formed of a thin porous membrane material such as filter paper. As best seen in FIG. 2, the upper and lower marginal ends of wall 34 are received within grooves 28 and 30 formed in members 14 and 16. Although walls 32 and 34 are shown in this form of the invention as being substantially coextensive in height with walls 18 and 26 respectively, for certain applications these walls may be of a lesser vertical height substantially corresponding to the distance between the upper surface of member 14 and the lower surface of member 16. In the filter of this form of the invention, the upper and lower marginal edges of walls 32 and 34 are not received within grooves formed in members 14 and 16, but rather engage the upper and lower internal surfaces thereof.

In either of the aforementioned forms of the invention, a filtering means is disposed between walls 32 and 34 for absorbing mercury vapor from air passing through the walls. Although a wide variety of materials may be used for the filtering means including activated charcoal, charcoal prepared from coconut shells and diatomaceous earth, the more efficient material for use in filtering mercury vapor has been found to be iodine impregnated charcoal. When this form of material is used for the filtering material the particle size is preferable 8 × 16 mesh standard, having a hardness of on the order of 10 percent (MIL-C-25596). As will be discussed in greater detail hereinafter, in manufacturing the filter, the filter material is vibrated so as to provide an apparent density of 0.5 to 0.6 g/ml. A pore volume of 0.5 ml. per gram and a void volume of approximately 0.4 ml. per ml.

Members 14 and 16 may be constructed of a wide variety of materials such as metal, plastic, rubber, or other composite materials. When members 14 and 16 are separately formed, the upper and lower margins of walls 18, 26, 32, and 34 are bonded within grooves 20, 22, 28, and 30 with any suitable bonding material or adhesive as, for example, a silicone rubber. Alternatively, members 14 and 16 may be cast in place over the upper and lower marginal edges of the side walls using a suitable plastic material such as, for example, polyvinylchloride.

The method of the invention for making this latter mentioned type of filter comprises the steps of first forming the moldable material about the lower marginal edges of wall members 18 and 26 to form the substantially annular disc-shaped base or bottom member 14. Next, porous membrane 32 is telescopically inserted interiorly of first wall member 18 in close proximity therewith. This done, porous member 30 is then placed over wall member 26 in close proximity therewith. The space defined between walls 32 and 34 is then filled with the filtering materials as, for example, a multiplicity of particles of iodine impregnated charcoal having a physical character heretofore described. The assembly thus formed is then vibrated for a period of time of approximately two to four seconds at a frequency of approximately 80 to 100 cycles per second to compact the particulate material. Additional material is then added to once again fill the annular cavity between the walls and the vibration cycle is repeated. This procedure is repeated until after vibration the annular cavity between the side walls is substantially filled. With the subassembly in this condition, a suitable material such as polyvinylchloride is formed about the upper marginal edges of walls 18 and 26 to form the annular disc-shaped top member 16, thereby sealably encapsulating the filter material within the space defined by walls 32 and 36 and members 14 and 16.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A mercury vapor absorbing filter adapted to be removably mounted within a circular-shaped outlet port of a controlled environment work enclosure in which a stream of air is drawn inwardly from atmosphere and exhausted at a relatively high velocity through said filter, comprising:

(a) vertically spaced-apart top and bottom annular-shaped members;

(b) transversely spaced-apart walls extending between said top and bottom members defining an annular-shaped cavity therebetween, said walls comprising a pair of contiguous, substantially parallel outer walls and a pair of contiguous, substantially parallel inner walls each of said pairs of walls comprising a first, substantially rigid open mesh wall and a second relatively thin porous membrane wall; and (c) a multiplicity of particles of iodine impregnated charcoal encapsulated within said cavity, said particle size being approximately 8×16 mesh standard with said particles being vibrated to provide an apparent material density within said cavity of approximately 0.5 to approximately 0.6 g/ml, whereby said material provides controlled impedance to the flow of air therethrough permitting mercury vapor to be effectively removed from the stream of air being exhausted from said work enclosure.

2. A filter as defined in claim 1 in which said particles have a hardness of on the order of 10 percent and in which said vibrated material within said cavity has a pore volume of on the order of 0.5 ml/gm and a void volume of approximately 0.4 ml/ml.

3. A filter as defined in claim 1 in which said top and bottom annular shaped members are provided with irregular inner surfaces whereby air flowing into said filter will not create channels within said material disposed within said cavity.

4. A filter as defined in claim 1 in which said thin porous membrane walls comprise a filter paper material.

5. A filter as defined in claim 1 in which rigid open mesh walls comprise a metal mesh material the margins of which are sealably interconnected with said top and bottom members.

6. A filter for removal of mercury in vapor and particulate form from a stream of air passing therethrough at relatively high velocity, comprising:
(a) vertically spaced-apart top and bottom annular-shaped members said members having irregularly shaped plural surfaces;
(b) transversely spaced apart walls extending between said top and bottom members defining an annular-shaped cavity therebetween, said walls comprising a pair of contiguous, substantially parallel outer walls and a pair of contiguous, substantially parallel inner walls each of said pairs of walls being sealably interconnected with said top and bottom members and comprising a first, substantially rigid open mesh wall and a second relatively thin porous membrane wall; and
(c) a multiplicity of particles of iodine impregnated charcoal encapsulated within said cavity, said particle size being approximately 8×16 mesh standard with said particles being vibrated to provide an apparent material density within said cavity of approximately 0.5 to approximately 0.6 g/ml, a pore volume of on the order of 0.5 ml/gm and a void volume of approximately 0.4 ml/ml whereby said material provides controlled impedance to the flow of air therethrough permitting mercury vapor to be effectively removed from the stream of air being exhausted from said work enclosure.

* * * * *